United States Patent
Suzuta et al.

(10) Patent No.: US 8,151,964 B2
(45) Date of Patent: Apr. 10, 2012

(54) MULTIPLE DISC CLUTCH APPARATUS

(75) Inventors: Masayoshi Suzuta, Saitama (JP); Hideo Senmyo, Saitama (JP); Yoshiki Nagahashi, Saitama (JP); Masaki Yoneyama, Saitama (JP); Shinya Wakabayashi, Saitama (JP); Kazumitsu Yamamoto, Saitama (JP); Hisao Otsuka, Saitama (JP); Masashi Furuya, Saitama (JP); Hiroshi Ori, Saitama (JP); Hideaki Segami, Shizuoka (JP); Katsu Yoshimoto, Shizuoka (JP)

(73) Assignee: Honda Motor Co., Ltd., Tokyo (JP)

( * ) Notice: Subject to any disclaimer, the term of this patent is extended or adjusted under 35 U.S.C. 154(b) by 301 days.

(21) Appl. No.: 12/640,614

(22) Filed: Dec. 17, 2009

(65) Prior Publication Data

US 2010/0163361 A1    Jul. 1, 2010

(30) Foreign Application Priority Data

Dec. 25, 2008   (JP) ............................. P. 2008-330045

(51) Int. Cl.
*F16D 13/52* (2006.01)
*F16D 43/21* (2006.01)

(52) U.S. Cl. .................................. 192/54.5; 192/70.23

(58) Field of Classification Search .................. 192/54.5, 192/70.23

See application file for complete search history.

(56) References Cited

U.S. PATENT DOCUMENTS

| 5,617,938 A | 4/1997 | Tsukada et al. |
| 8,025,138 B2 * | 9/2011 | Yoshinaga et al. ............ 192/54.5 |
| 2008/0029332 A1 * | 2/2008 | Gokan et al. .................. 180/383 |
| 2008/0099298 A1 | 5/2008 | Yoshinaga et al. |
| 2009/0071792 A1 * | 3/2009 | Kataoka et al. ............. 192/93 R |
| 2009/0078526 A1 * | 3/2009 | Kawatsu et al. ........... 192/70.23 |

FOREIGN PATENT DOCUMENTS

| DE | 195 36 424 C2 | 4/1996 |
| EP | 1 916 434 A1 | 4/2008 |
| JP | 2004-011764 A | 1/2004 |
| JP | 2007-177890 A | 7/2007 |
| JP | 2008-106846 A | 5/2008 |

\* cited by examiner

*Primary Examiner* — Richard M. Lorence (74) *Attorney, Agent, or Firm* — Birch, Stewart, Kolasch & Birch, LLP (57) ABSTRACT

In a multiple disc clutch apparatus 10, a cam member 41 which is disposed on a side of a clutch inner member 16 is formed into an annular shape. The cam member 41 extends in a radial direction so that an outer circumferential surface of the cam member 41 is brought into abutment with a cylindrical face 19*d* on an inner circumferential surface of a clutch center member 19.

7 Claims, 6 Drawing Sheets

MULTIPLE DISC CLUTCH APPARATUS

BACKGROUND OF THE INVENTION

1. Field of the Invention

The present invention relates to a multiple disc clutch apparatus which transfers or interrupts a driving force from an input member and more particularly to a multiple disc clutch apparatus which includes a cam mechanism for suppressing an action of a reverse driving force from an output shaft towards the input member side.

2. Background Art

There is known, as a conventional multiple disc clutch apparatus, a multiple disc clutch apparatus provided with an clutch outer member which is coupled to an input member, a clutch inner member which is fixed to an output member, a plurality of primary friction discs which are brought into engagement with the clutch outer member so as not to rotate relatively, a plurality of secondary friction discs which are disposed alternately with the primary friction discs in an axial direction, a clutch center member with which the secondary friction discs are brought into engagement so as not to rotate relatively, a pressure plate which holds the primary friction discs and the secondary friction discs in the axial direction between the clutch inner member and itself, a clutch spring which biases the pressure plate towards a side where the primary friction discs and the secondary friction discs are brought into press contact, and a cam mechanism which is provided between the clutch inner member and the clutch center member for transferring a driving force from the input member from the clutch center member to the clutch inner member and pressing the pressure plate via the clutch center member against the biasing force of the clutch spring towards a side where the pressure plate is spaced away from the clutch inner member when a reverse driving force acts thereon from the output member, wherein the cam mechanism has a projecting cam and a recess cam, as well as a primary inclined surface and a secondary inclined surface which are inclined in the same direction relative to a circumferential direction, and wherein the projecting cam and the recess cam are brought into point contact with each other (for example, refer to JP-A-2008-106846).

In the conventional multiple disc clutch apparatus, in order to cause the clutch center member to slide in the axial direction smoothly, some clearance is provided in the sliding portion. However, this clearance so provided offsets a rotating axis of the clutch center member with respect to a rotating axis of the clutch inner member, and this causes the clutch center member to fall (incline), leading to the possibility that the feeling is affected which is felt by the driver when he or she engages or disengages the clutch. In the multiple disc clutch apparatus described in JP-A-2008-106846, since the projecting cam and the recess cam contact each other at a point, the fall of the clutch center member tends to occur easily, a countermeasure against which has been desired.

SUMMARY OF THE INVENTION

One or more embodiments of the invention provide a multiple disc clutch apparatus which can prevent a fall of a clutch center member and can improve accuracy with which the clutch is engaged and disengaged.

In accordance with one or more embodiments of the invention, a multiple disc clutch apparatus 10 is provided with: a clutch outer member 15 which is coupled to an input member 14; a clutch inner member 16 which is fixed to an output shaft 13 so as not to rotate with respect to the output shaft 13; a plurality of primary friction discs 17 which are fixed to the clutch outer member 15 so as not to rotate with respect to the clutch outer member 15; a plurality of secondary friction discs 18 which are disposed alternately with the primary friction discs 17 in an axial direction; a pressure plate 20, wherein the primary friction discs 17 and the secondary friction discs 18 are held between the clutch inner member 16 and the pressure plate 20 in the axial direction; a clutch center member 19 which is provided between the clutch inner member 16 and the pressure plate 20 in the axial direction, wherein the secondary friction discs 18 are fixed to the clutch center member 19 so as not to rotate with respect to the clutch center member 19; and a cam mechanism 40 adapted to axially move the primary friction discs 17 and the secondary friction discs 18 in a direction in which the primary friction discs 17 and the secondary friction discs 18 are brought into press contact or in a direction in which the primary friction discs 17 and the secondary friction discs 18 move away. The cam mechanism 40 comprises a pair of cam members 41, 42 including a projecting cam 43 and a recess cam 44. The pair of cam members 41, 42 are provided between the clutch inner member 16 and the clutch center member 19. Contact surfaces of the projecting cam 43 and the recess cam 44 are formed into a curved surface. One 41 of the cam members 41, 42 which is disposed on a side of the clutch inner member 16 is formed into an annular shape. The one 41 of the cam members 41, 42 on the side of the clutch inner member 16 extends in a radial direction, and an outer circumferential surface of the one 41 of the cam members 41, 42 is brought into abutment with a cylindrical face 19d on an inner circumferential surface of the clutch center member 19.

According to the above structure, since the cam member which is disposed on the side of clutch inner member is formed into the annular shape, and the cam member which is disposed on the side of the clutch inner member is caused to extend in the radial direction so that the outer circumferential surface of the cam member which is disposed on the side of the clutch inner member is brought into abutment with the cylindrical face which is formed on the inner circumferential surface of the clutch center member, the cylindrical face of the clutch center member is guided by the outer circumferential surface of the cam member which is disposed on the side of the clutch inner member, whereby a concentricity of the clutch center member can be improved. Since a fall of the clutch center member can be prevented by this, parallelism between the primary friction discs and the secondary friction discs can be held, thereby making it possible to improve an accuracy with which the clutch is engaged and disengaged.

Further, in the multiple disc clutch apparatus 10, the cam mechanism 40 may include: an assist mechanism adapted to axially move the primary friction discs 17 and the secondary friction discs 18 in the direction in which the primary friction discs 17 and the secondary friction discs 18 are brought into press contact in response to a change in torque of the input member 14 and the output shaft 13 so as to increase an engaging force of the clutch 10; and a back torque reduction mechanism adapted to axially move the primary friction discs 17 and the secondary friction discs 18 in the direction in which the primary friction discs 17 and the secondary friction discs 18 move away so as to reduce the engaging force of the clutch 10. Curvatures of contact surfaces 51, 61 of the projecting cam 43 and the recess cam 44 which act when the assist mechanism operates and curvatures of contact surfaces 52, 62 of the projecting cam 43 and the recess cam 44 which act when the back torque reduction mechanism operates may be made different. A whole of the outer circumferential surface of the one 41 of the cam members 41, 42 on the side of the clutch inner member 16 may be brought into abutment with the cylindrical face of the clutch center member 19.

According to the above structure, the cam mechanism has the assist mechanism for moving axially the primary friction discs and the secondary friction discs in the direction in which the primary and secondary friction discs are brought into press contact in response to a change in torque of the input member and the output shaft so as to increase the engaging force of the clutch and the back torque reduction mechanism for moving axially the primary friction discs and the secondary friction discs in the direction in which the primary and secondary friction discs move away so as to reduce the engaging force of the clutch. In addition, the curvatures of the contact surfaces of the projecting cam and the recess cam which act when the assist mechanism operates and the curvatures of the contact surfaces of the projecting cam and the recess cam which act when the back torque reduction mechanism operates are made different. Due to these, torque that is transferred to the clutch differs between when the former mechanism operates and when the later mechanism operates, and loads produced in the cam members also differ due to the torque transferred differently. When this is attempted to be solved by adjusting the surface contact pressure at the contact surfaces by making different the curvatures of the contact surfaces of the projecting cam and the recess cam, it is considered that the inclination of the clutch center member normally changes every time each mechanism operates. However, since the whole of the outer circumferential surface of the cam member which is disposed on the clutch inner member side is brought into abutment with the cylindrical face of the clutch center member, the fall of the clutch center member can be prevented whether either of the two mechanisms operates.

Further, in the multiple disc clutch apparatus 10, the projecting cam 43 or the recess cam 44 disposed on the one 41 of the cam members 41, 42 on the side of the clutch inner member 16 may be provided on a plane which is perpendicular to an axis X of the output shaft 13.

According to the above structure, since the projecting cam or the recess cam of the cam member which is disposed on the side of the clutch inner member is provided on the plane which perpendicular to the axis of the output shaft, each configuration surface is allowed to have a different function so that a plurality of functions are divided on the single member, thereby making it possible to improve the reliability of the mechanisms.

Further, in the multiple disc clutch apparatus 10, a radial width W4 of a cam 46 of the recess cam 44 which acts when the back torque reduction mechanism operates may be made larger than a radial width W5 of a cam 45 of the recess cam 44 which acts when the assist mechanism operates.

According to the above structure, since the radial width of the cam of the recess cam which acts when the back torque reduction mechanism operates is made larger than the radial width of the cam of the recess cam which acts when the assist mechanism operates, the strength of the cam which acts when the back torque mechanism operates while being applied with larger torque than that applied to the cam which acts when the assist mechanism operates can be increased.

Further, in the multiple disc clutch apparatus 10, a radial width W1 of the projecting cam 43 may be made larger than a radial width W2, W3 of the contact surface 51, 52 of the projecting cam 43.

According to the above structure, since the radial width of the projecting cam is made larger than the radial width of the contact surface of the projecting cam, the strength of the projecting cam can be increased.

Further, in the multiple disc clutch apparatus, a bottom surface 48 of the recess cam 44 which lies on a side facing the cam 45 which acts when the assist cam mechanism operates may be made deeper than a bottom surface 47 of the recess cam 44 which lies on a side facing the cam 46 which acts when the back torque reduction mechanism operates.

According to the above structure, since the bottom surface of the recess cam which lies on the side facing the cam which acts when the assist cam mechanism operates is made deeper than the bottom surface of the recess cam which lies on the side facing the cam which acts when the back torque reduction mechanism operates, the degree of close attachment between the cam of the recess cam which acts when the assist mechanism operates and the projecting cam can be increased. In addition, since only the bottom surface of the required portion is made deeper, the thickness of the recess cam which lies on the side facing the cam which acts when the back torque reduction mechanism operates does not have to be reduced, thereby making it possible to increase the strength of the cam which acts when the back torque reduction mechanism operates.

Moreover, the multi disc clutch apparatus 10 may be further provided with: a judder spring 71 which is fitted around the clutch center member 19; and a spring seat 72 which configures a receiving seat for the judder spring 71. The spring seat 72 may be spline fitted on an outer circumferential surface of the clutch center member 19.

According to the above structure, since the multiple disc clutch apparatus comprises the judder spring which is fitted around the clutch center member and the spring seat which configures a receiving seat for the judder spring and the spring seat is spline fitted on the outer circumferential surface of the clutch center member, radial and circumferential movements of the spring seat are restricted, thereby making it possible to suppress the wear of the clutch center member by the spring seat. In addition, since the movement of the judder spring is reduced by the movement of the spring seat being restricted, the wear of the clutch center member by the judder spring can also be suppressed.

Other aspects and advantages of the invention will be apparent from the following description, the drawings and the claims.

BRIEF DESCRIPTION OF THE DRAWINGS

FIG. 4(*a*) is a plan view of a primary cam member. FIG. 4(*b*) is a sectional view taken along a line C-C in FIG. 4(*a*).

FIG. 5(*a*) is a plan view of a secondary cam member. FIG. 5(*b*) is a sectional view taken along a line D-D in FIG. 5(*a*).

DETAILED DESCRIPTION OF THE EXEMPLARY EMBODIMENTS

An exemplary embodiment of a multiple disc clutch apparatus according to the invention will be described in detail based on accompanying drawings. Note that the drawings are to be seen in a direction in which given reference numerals look normal.

Figure 1:
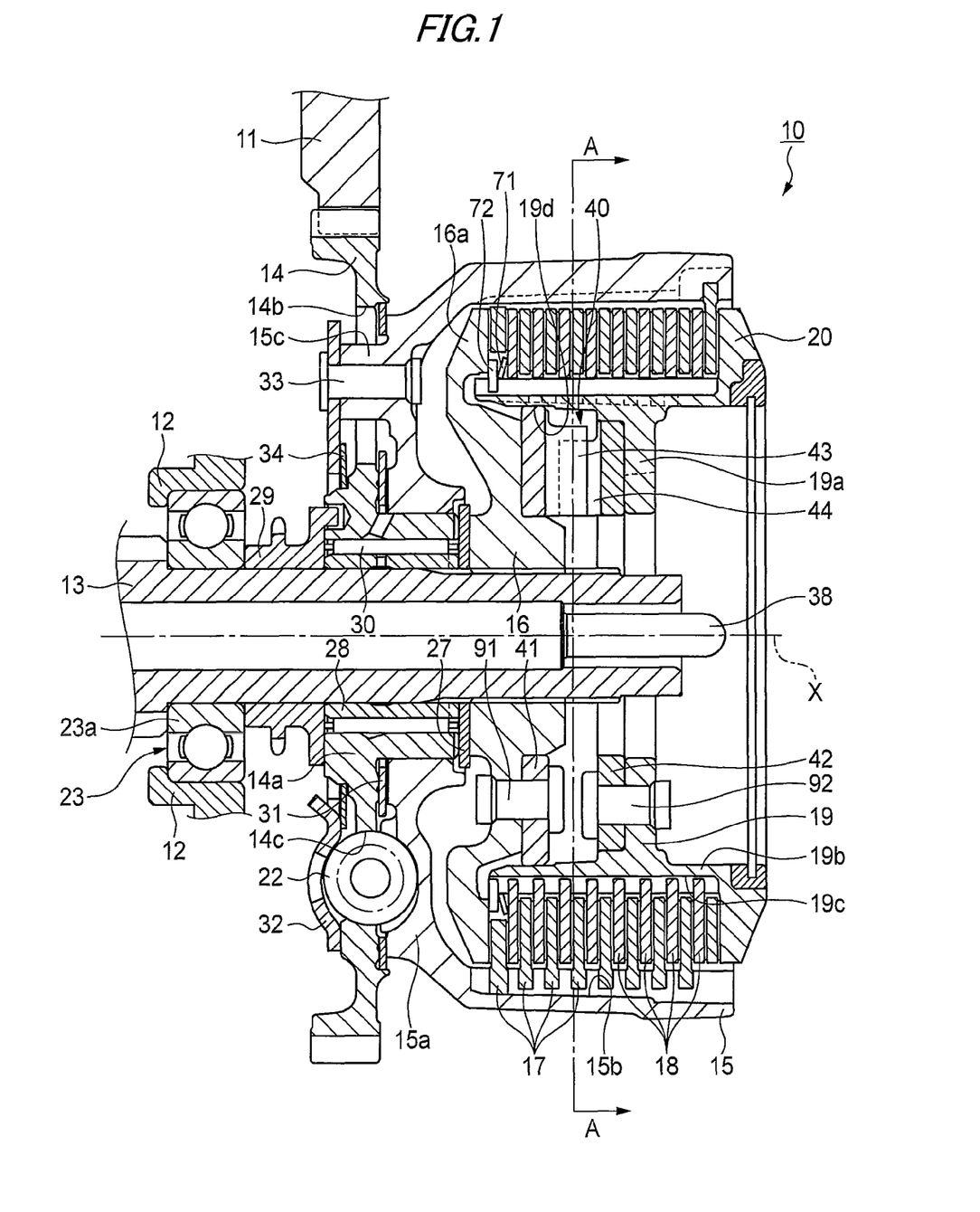
FIG. 1 is a main part sectional view of a multiple disc clutch apparatus according to an exemplary embodiment of the invention.

As is shown in FIG. 1, a driving force outputted from a crankshaft, not shown, is transferred to a main shaft 13 of a transmission which is supported rotatably on a crankcase 12 by way of a drive gear 11 which is provided on the crankshaft, not shown, a driven gear 14 which is supported rotatably on the main shaft 13 and which meshes with the drive gear 11, and a multiple disc clutch apparatus 10 of the embodiment which is provided between the driven gear 14 and the main shaft 13.

As is shown in FIG. 1, the multiple disc clutch apparatus 10 of the embodiment includes a clutch outer member 15 which is coupled to the driven gear 14, which acts as an input member, a clutch inner member 16 which is fixed to the main shaft 13, which acts as an output shaft, so as not to rotate relatively, a plurality of primary friction discs 17 which are brought into engagement with the clutch outer member 15 so as not to rotate relatively, a plurality of secondary friction discs 18 which are disposed alternately with the primary friction discs 17 in an axial direction, a pressure plate 20 for holding the primary friction discs 17 and the secondary friction discs 18 between the clutch inner member 16 and itself, a clutch center member 19 with which the secondary friction discs 18 are brought into engagement so as not to rotate relatively and which is provided between the clutch inner member 16 and the pressure plate 20 in the axial direction so as to move in the axial direction, and a cam mechanism 40 which is provided so as to move the primary friction discs 17 and the secondary friction discs 18 in a direction in which the primary and secondary friction discs are brought into press contact or in a direction in which the primary and secondary friction discs move away. In this embodiment, the pressure plate 20 is molded integrally with the clutch center member 19.

A spacer 27, a cylindrical sleeve 28 which is fitted around the main shaft 13 and an auxiliary driving gearwheel 29 for driving auxiliaries are held sequentially in that order as viewed from the clutch inner member 16 side between an inner ring 23a of a ball bearing 23 which is interposed between the main shaft 13 and the crankcase 12 and the clutch inner member 16 which is spline fitted around the main shaft 13. A boss 14a of the driven gear 14 is supported rotatably via a needle bearing 30 which is provided around an outer circumferential surface of the sleeve 28.

The clutch outer member 15 is made of aluminum and has an end wall 15a which lies on a side facing the driven gear 14 so as to be formed into a bottomed cylindrical shape, and an annular sliding plate 31 is interposed between the driven gear 14 and the end wall 15a. Engagement grooves 15b with which the plurality of friction discs 17 are brought into engagement are formed on an inner circumferential surface of the outer clutch 15 circumferentially at substantially equal intervals.

Coupling bosses 15c are provided circumferentially on the end wall 15a of the clutch outer member 15 at a plurality of locations so as to project therefrom. On the other hand, a plurality of elongated holes 14b are provided on the driven gear 14 in positions which are spaced away circumferentially at intervals so as to extend in the circumferential direction. The coupling bosses 15c are inserted through these elongated holes 14b, respectively. Further, holding plates 32, which face a side surface of the driven gear 15 on an opposite side to the end wall 15a, are brought into abutment with end faces of the coupling bosses 15c of the clutch outer member 15. These holding plates 32 are fixed to the coupling bosses 15c by rivets 33 which penetrate through the coupling bosses 15c. A diaphragm spring 34 is provided between the holding plates 32 and the driven gear 14 for biasing both the driven gear 14 and the end wall 15a so that the driven gear 14 and the end wall 15a are brought into contact with both sides of the sliding plate 31, respectively.

Circumferentially extending holding holes 14c are formed on the driven gear 14 at a plurality of locations whose circumferential phases differ from the plurality of elongated holes 14b, and damper springs 22 which are interposed between the driven gear 14 and the clutch outer member 15 are accommodated in these holding holes 14c.

The clutch inner member 16 is made of aluminum, has a pressure receiving plate portion 16a at an outer circumferential portion, and is formed into a circular ring-like shape.

The clutch center member 19 is made of aluminum and has a circular ring portion 19a and an outer cylindrical portion 19b which is formed at a radially outer end portion of the circular ring portion 19a and which is disposed between the clutch inner member 16 and the pressure plate 20. Engagement grooves 19c with which the secondary friction discs 18 are to be brought into engagement are formed circumferentially on an outer circumferential surface of the outer cylindrical portion 19b at substantially equal intervals.

The pressure plate 20 is made of aluminum and is molded integrally with an axial outer end portion of the outer cylindrical portion 19b of the clutch center member 19. The pressure plate 20 is pressed axially inwards together with the clutch center member 19 by a biasing force of a clutch spring, not shown, and the primary and secondary friction discs 17, 18, which are disposed alternately, are biased towards the pressure receiving plate portion 16a of the clutch inner member 16. Namely, in this embodiment, the clutch center member 19 and the pressure plate 20 are normally biased by the clutch spring, not shown, so that the clutch is in an engaged state.

Connected to the pressure plate 20 are a lifter plate, not shown, a clutch release bearing and a lifter shaft 38 which moves back and forth in the axial direction in response to a clutch operating member, not shown, being operated. By the lifter shaft 38 moving rightwards in FIG. 1, the clutch center member 19 and the pressure plate 20 move towards a side where they move away from the pressure receiving plate portion 16a of the clutch inner member 16 against the biasing force of the clutch spring. By this, the friction engagement between the primary friction discs 17 and the secondary friction discs 18 is released, whereby the transfer of driving force between the clutch outer member 15 and the main shaft 13 is interrupted.

Figure 2:
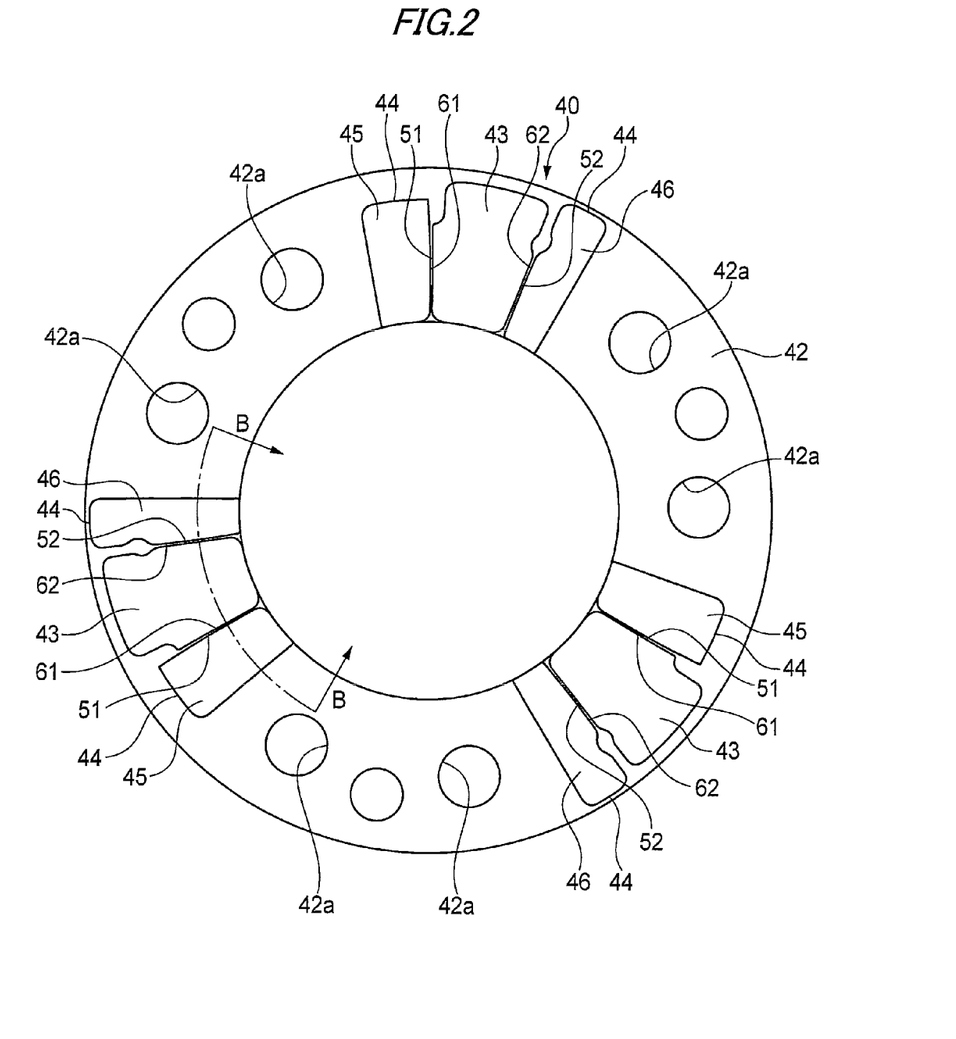
FIG. 2 is a sectional view taken along a line A-A and viewed in a direction indicated by arrows attached to the line in FIG. 1.

The cam mechanism 40 transfers the driving force from the driven gear 14 from the clutch center member 19 to the clutch inner member 16, and when a reverse driving force is applied from the main shaft 13, the cam mechanism 40 presses the clutch center member 19 to a side where the clutch center member 19 moves away from the clutch inner member 16 against the biasing force of the clutch spring. As is shown in FIGS. 1 to 3, the cam mechanism 40 includes a primary cam member 41 and a secondary cam member 42 which are a pair of cam members provided between the clutch inner member 16 and the clutch center member 19, and in this embodiment, the primary cam member 41 is attached to the clutch inner member 16, while the second cam member 42 is attached to the clutch center member 19.

Figures 4A, 4B:
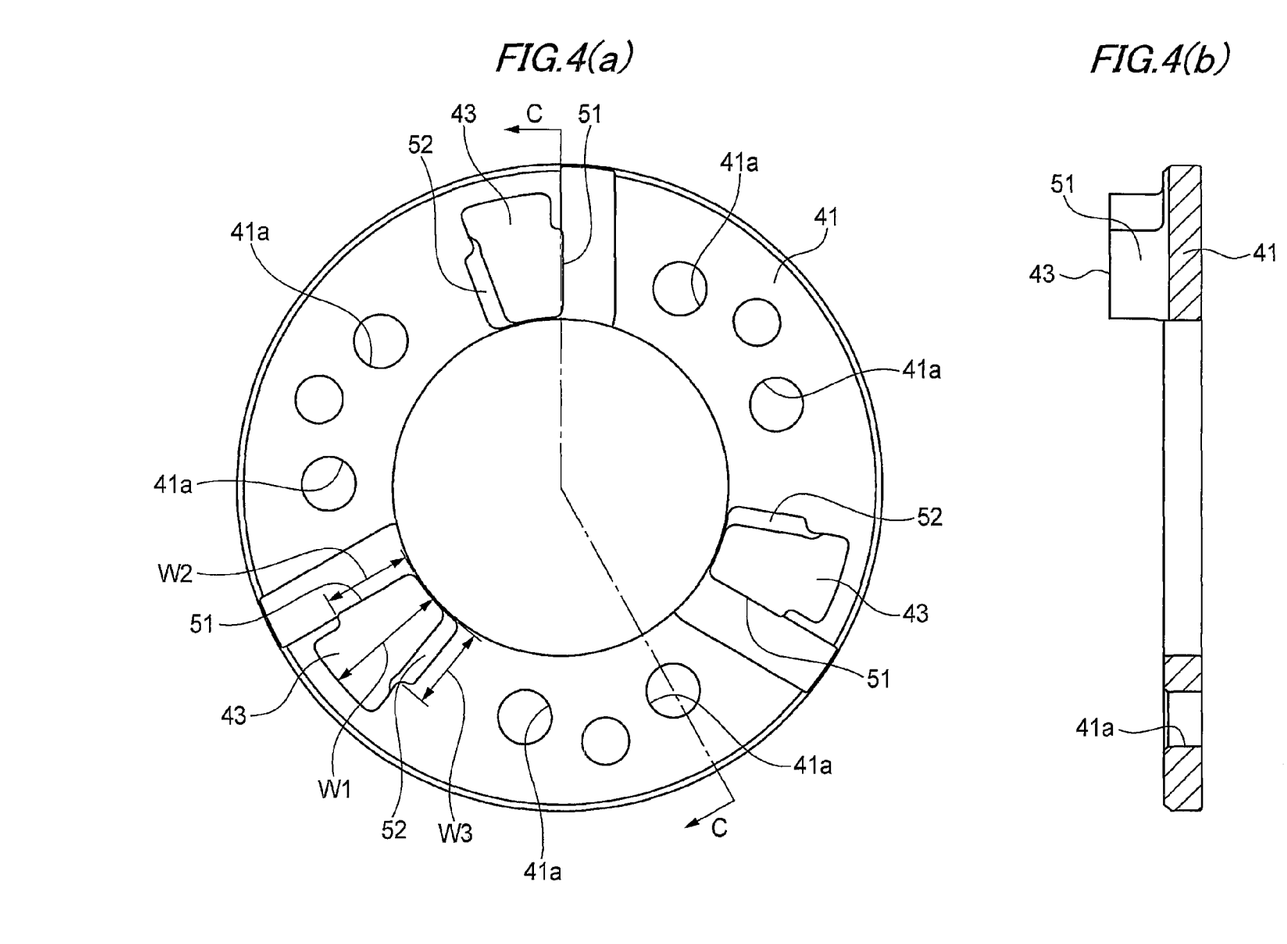

The primary cam member 41 is made of carburizing steel and has a circular ring shape as is shown in FIGS. 1 and 4. The primary cam member 41 is fixed to the clutch inner member 16 by a plurality of rivets 91 which penetrate through the clutch center member 19. Through holes 41a, through which the rivets 91 penetrate, are formed circumferentially in the primary cam member 41 at predetermined intervals. Three projecting cams 43 are formed circumferentially on a side of the primary cam member 41 which lies to face the clutch center member 19 at substantially equal intervals so as to project to the clutch center member 19 side. The projecting cams 43 are integrally formed on a plane of the primary cam member 41 which intersects an axis X of the main shaft 13 at right angles.

Figure 5A:
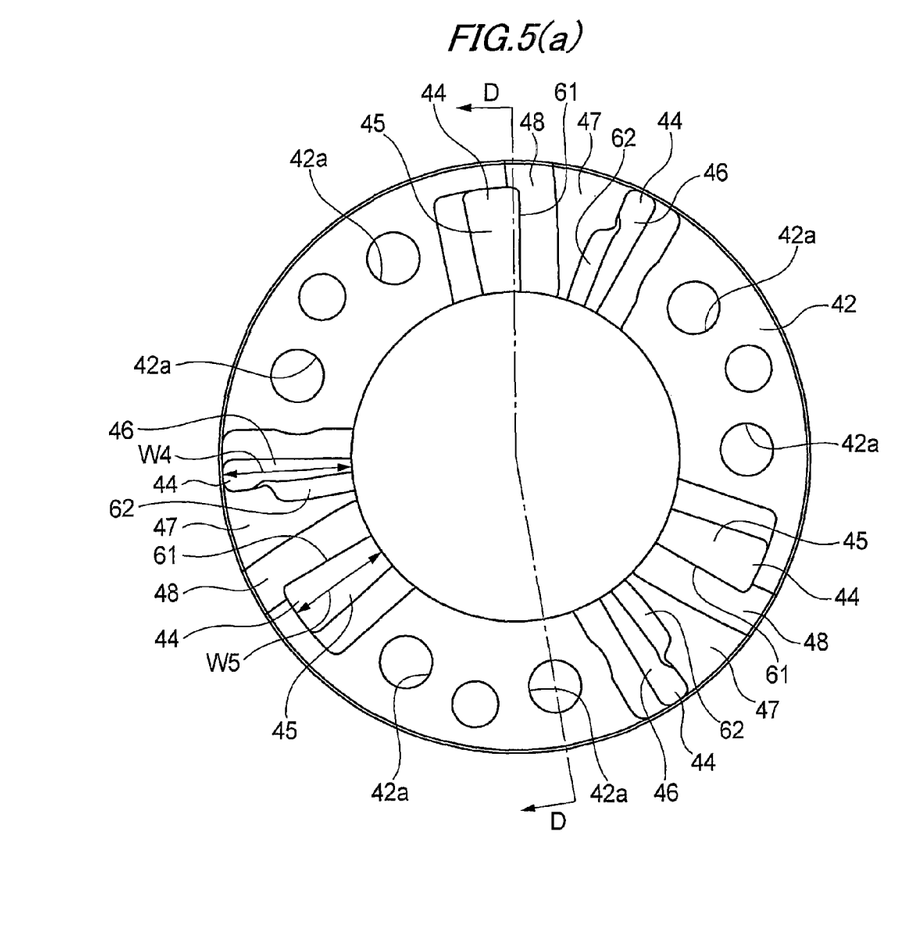
Figure 5B:
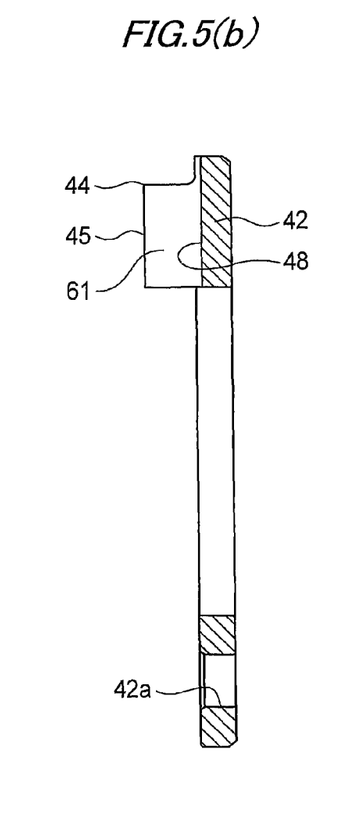

The secondary cam member 42 is made of carburizing steel and has a circular ring shape as is shown in FIGS. 1 and 5(a). The secondary cam member 42 is fixed to the clutch center member 19 by a plurality of rivets 92 which penetrate through the clutch center member 19. Through holes 42a, through which the rivets 92 penetrate, are formed circumferentially in the secondary cam member 42 at predetermined intervals. Three recess cams 44 are formed circumferentially on a side of the secondary cam member 42 which lies to face the clutch inner member 16 at substantially equal intervals so as to project to the clutch inner member 19 side so that the projecting cams 43 are inserted thereinto, respectively. The recess cams 44 are molded integrally on the secondary cam member 42.

Figure 3:
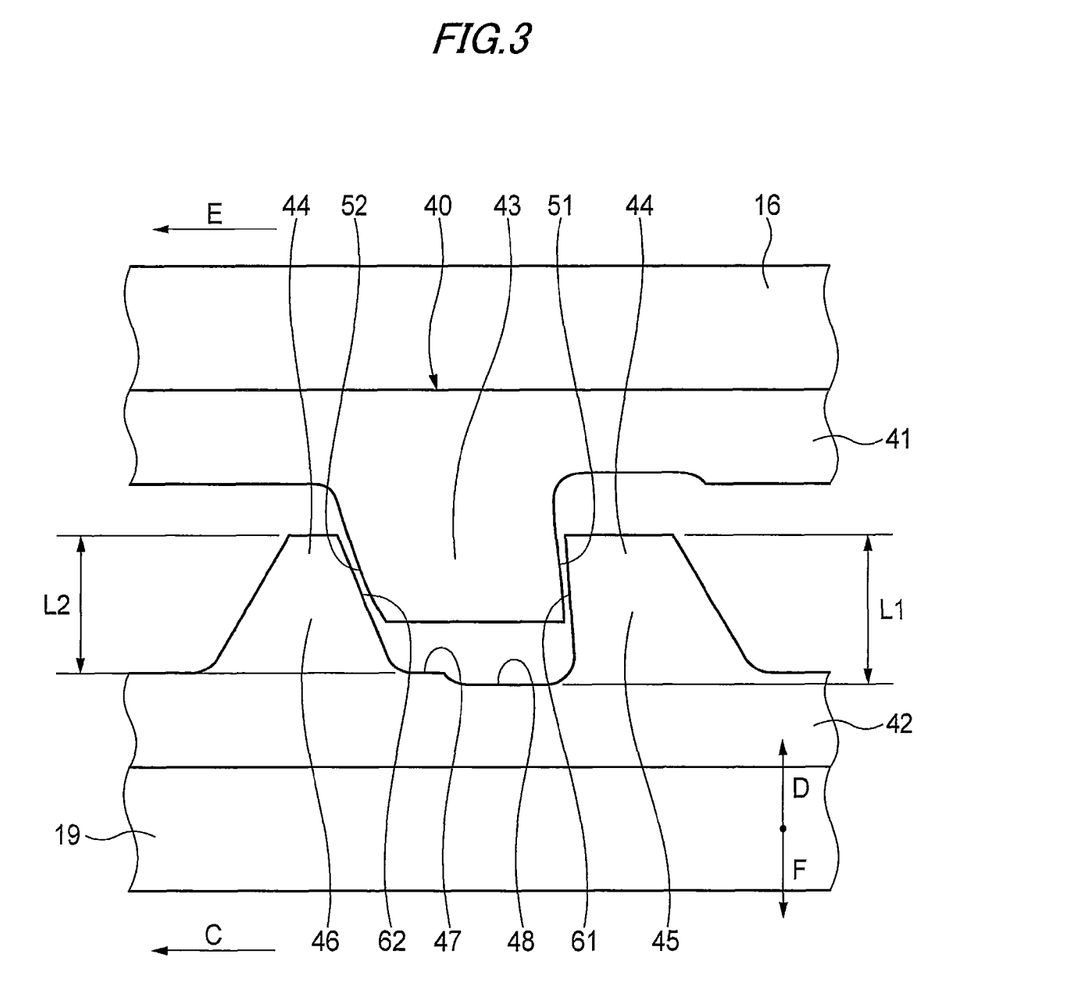
FIG. 3 is a sectional view taken along a line B-B and viewed in a direction indicated by arrows attached to the line in FIG. 2.

As is shown in FIGS. 3 and 4(a), a primary contact surface 51 and a secondary contact surface 52 are formed on circumferential outer surfaces of the projecting cam 43 so as to be inclined in the same direction relative to the circumferential direction. The primary contact surface 51, which is one of the contact surfaces, is a cam surface which is brought into engagement with the recess cam 44 so as to move the clutch center member 19 towards the clutch inner member 16 side when the driving force is applied from the driven gear 14 to the primary cam member 41 to thereby increase the engaging force of the clutch, while the secondary contact surface 52, which is the other of the contact surfaces, is a cam surface which is brought into abutment with the recess cam 44 so as to move the clutch center member 19 to a side where the clutch center member 19 moves away from the clutch inner member 16 when the reverse driving force is applied from the main shaft 13 to the primary cam member 41 to thereby the engaging force of the clutch. The primary contact surface 51 and the secondary contact surface 52 are formed on respective axial curved surfaces.

As is show in FIGS. 3 and 5 (a), the recess cam 44 has an assist cam 45 which is brought into engagement with the primary contact surface 51 of the projecting cam 43 so as to move the clutch center member 19 towards the clutch inner member 16 side when the driving force is applied from the driven gear 14 to the secondary cam member 42 to thereby increase the engaging force of the clutch and a back torque reduction cam 46 which is brought into abutment with the secondary contact surface 52 of the projecting cam 43 so as to move the clutch center member 19 to the side where the clutch center member 19 moves away from the clutch inner member 16 when the reverse driving force is applied from the main shaft 13 to the secondary cam member 42 to thereby reduce the engaging force of the clutch. Both radial end portions of the recess cam 44 are opened.

A primary contact surface 61, which is a cam surface to be brought into engagement with the primary contact surface 51 of the projecting cam 43, is formed on a circumferential inner surface of the assist cam 45, while a secondary contact surface 62, which is a cam surface to be brought into abutment with the secondary contact surface 52 of the projecting cam 43, is formed on a circumferential inner surface of the back torque reduction cam 46. The primary contact surface 16 and the secondary contact surface 62 are formed so as to be inclined in the same direction relative to the circumferential direction. The primary contact surface 61 and the secondary contact surface 62 are formed on radial curved surfaces, respectively.

In this embodiment, an assist mechanism for moving axially the primary friction discs 17 and the secondary friction discs 18 in a direction in which the primary and secondary friction discs are brought into press contact in response to a change in torque of the driven gear 14 and the main shaft 13 so as to increase the engaging force of the clutch is made up of the primary contact surface 51 of the projecting cam 43 and the primary contact surface 61 of the recess cam 44. A back torque reduction mechanism for moving axially the primary friction discs 17 and the secondary friction discs 18 in a direction in which the primary and secondary friction discs move away in response to a change in torque of the driven gear 14 and the main shaft 13 so as to reduce the engaging force of the clutch is made up of the secondary contact surface 52 of the projecting cam 43 and the secondary contact surface 62 of the recess cam 44. Then, curvatures of the primary contact surface 51 of the projecting cam 43 and the primary contact surface 61 of the recess cam 44 which act when the assist mechanism operates are set to differ from curvatures of the secondary contact surface 52 of the projecting cam 43 and the secondary contact surface 62 of the recess cam 44 which act when the back torque reduction mechanism operates.

In this embodiment, as is shown in FIG. 1, an outer circumferential surface of the primary cam member 41 which is disposed on the cam inner 16 side is caused to extend radially, and the whole of the outer circumferential surface of the primary cam member 41 is brought into abutment with a cylindrical face 19d formed on an inner circumferential surface of the outer cylindrical portion 19b of the clutch center member 19. Because of this, since the cylindrical face 19d of the clutch center member 19 is guided by the outer circumferential surface of the primary cam member 41, the clutch center member 19 is centered.

In this embodiment, as is shown in FIG. 4(a), a radial width W1 of the projecting cam 43 is set to be larger than a radial width W2 of the primary contact surface 51 and a radial width W3 of the secondary contact surface 52 of the projecting cam 43.

In this embodiment, as is shown in FIG. 5(a), a radial width W4 of the back torque reduction cam 46 of the recess cam 44 is set to be larger than a radial width W5 of the assist cam 45 of the recess cam 44.

In this embodiment, as is shown in FIGS. 3 and 5(a), a recess portion 48 is formed in a bottom portion 47 of the recess cam 44 on a side facing the assist cam 45, and an axial length L1 of the assist cam 45 of the recess cam 44 is set to be longer than an axial length L2 of the back torque reduction cam 46 of the recess cam 44. Namely, a bottom surface of the portion of the recess cam 44 which lies to face the cam (the assist cam 45) which acts when the assist mechanism operates is set to be deeper than a bottom surface of the portion of the recess cam 44 which lies to face the cam (the back torque reduction cam 46) which acts when the back torque reduction mechanism operates.

Further, as is shown in FIG. 1, the multiple disc clutch apparatus 10 of the embodiment includes a judder spring 71 which is fitted around the outer cylindrical portion 19b of the clutch center member 19 and a spring seat 72 which functions as a receiving seat for the judder spring 71 between the pressure receiving plate portion 16a of the clutch inner member 16 and the secondary friction disc 18 which is disposed closest to the pressure receiving plate portion 16a.

The judder spring 71 is a diaphragm spring and is brought into engagement with an inner surface of the secondary friction disc 18 and an outer end face of the spring seat 72 at both ends thereof while being disposed therebetween. Thus, the judder spring 71 normally biases the secondary friction disc 18 towards the pressure plate 20.

Figure 6:
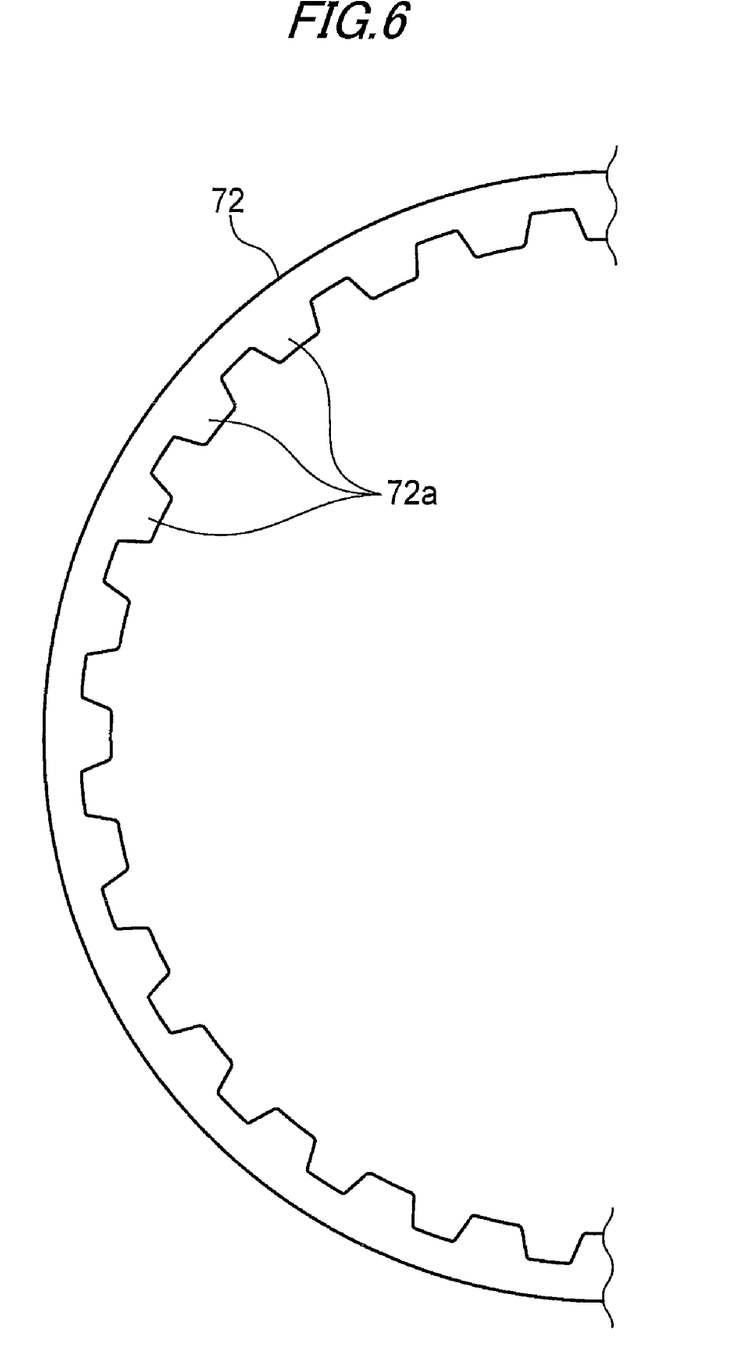
FIG. 6 is a partially cutaway plan view which illustrates a spring seat in FIG. 1.

As is shown in FIG. 6, the spring seat 72 is a thin circular ring-like member made of carburizing steel, and engagement projecting portions 72a are formed circumferentially at substantially equal intervals on an inner circumferential edge thereof so as to be spline fitted in engagement grooves 19c around the clutch center member 19. Thus, the spring seat 72 is spline fitted in the engagement grooves 19c around the clutch center member 19. By this, radial and circumferential movements of the spring seat 72 are restricted.

In the multiple clutch apparatus 10 configured as has been described heretofore, in the event that the driving force is transferred from the driven gear 14 to thereby rotate the clutch center member 19 (the secondary cam member 42) in a direction indicated by an arrow C (refer to FIG. 3), the primary contact surface 51 of the projecting cam 43 and the primary contact surface 61 of the recess cam 44 are brought into engagement with each other through point contact therebetween, and the clutch center member 19 is moved towards the clutch inner member 16 side (a direction indicated by an arrow D in FIG. 3). By this, the friction engaging force between the primary friction discs 17 and the secondary friction discs 18 is increased, whereby the driving force transferred to the clutch center member 19 is transferred to the clutch inner member 16 with god efficiency.

In the event that the reverse driving force is applied from the main shaft 13 to thereby rotate the clutch inner member 16 (the primary clutch member 41) in a direction indicated by an arrow E (refer to FIG. 3), the secondary contact surface 52 of the projecting cam 43 and the secondary contact surface 62 of the recess cam 44 are brought into abutment with each other through point contact, and the clutch center member 19 is caused to move towards the side where the clutch center member 19 moves away from the clutch inner member 16 side (a direction indicated by an arrow F in FIG. 3). By this, the friction engaging force between the primary friction discs 17 and the secondary friction discs 18 is reduced, whereby the reverse driving force attempting to act on the clutch center member 19 is suppressed.

In this embodiment, since the cylindrical face 19d of the clutch center member 19 is guided by the outer circumferential surface of the primary can member 41 which is provided concentrically with the main shaft 13, the clutch center member 19 is centered, whereby the concentricity of the clutch center member 19 is improved. By this, since the fall of the clutch center member 19 is prevented, the parallelism between the primary friction discs 17 and the secondary friction discs 18 is held, whereby the accuracy with which the clutch is engaged and disengaged is improved.

Thus, as has been described heretofore, according to the multiple disc clutch apparatus 100 of the embodiment, since the primary cam member 41 which is disposed on the clutch inner member 16 side is formed into the circular ring-like shape and the outer circumferential surface of the primary cam member 41 is caused to extend radially so as to be brought into abutment with the cylindrical face 19d formed on the inner circumferential surface of the outer cylindrical portion 19b the clutch center member 19, the cylindrical face 19d of the clutch center member 19 can be guided by the outer circumferential surface of the primary cam member 41, thereby making it possible to improve the concentricity of the clutch center member 19. Since the fall of the clutch center member 19 can be prevented by this, the secondary friction discs 18 is held, whereby the accuracy with which the clutch is engaged and disengaged is improved.

According to the multiple disc clutch apparatus 10 of the embodiment, the curvatures of the primary contact surface 51 of the projecting cam 43 and the primary contact surface 61 of the recess cam 44 which act when the assist mechanism operates are made to differ from the curvatures of the secondary contact surface 52 of the projecting cam 43 and the secondary contact surface 62 of the recess cam 44 which act when the back torque reduction mechanism operates. Therefore, the torque transferred to the clutch differs every time each mechanism operates, and the difference in torque so transferred produces different loads in the primary cam member 41 and the secondary cam member 42. In the event that the contact pressures at the contact surfaces 51, 52, 61, 62 are attempted to be adjusted by making the curvatures of the contact surfaces 51, 52, 61, 62 of the projecting cam 43 and the recess cam 44 differ for each mechanism, although it is considered normally that the degree of inclination of the clutch center member 19 differs every time each mechanism operates, since the whole of the outer circumferential surface of the primary cam member 41 is brought into abutment with the cylindrical face 19d of the clutch center member, the fall of the clutch center member 19 can be prevented whether either of the mechanisms operates.

According to the multiple disc clutch apparatus 10 of the embodiment, since the projection cams 43 are provided on the plane of the primary cam member 41 which intersects the axis X of the main shaft 13 at right angles, the configuration surfaces are allowed to be given the different functions, thereby making it possible to improve the reliability of the mechanisms by dividing the plurality of functions on the single member.

According to the multiple disc clutch apparatus 10 of the embodiment, since the radial width W1 of the projecting cam 43 is made larger than the radial width W2 of the primary contact surface 51 of the projecting cam 43 and the radial width W3 of the secondary contact surface 52 of the projecting cam, the strength of the projecting cam 43 can be increased.

According to the multiple disc clutch apparatus 10 of the embodiment, the radial width W4 of the back torque reduction cam 46 of the recess cam 44 is made larger than the radial width W5 of the assist cam 45 of the recess cam 44, the strength of the back torque reduction cam 46 can be increased to which larger torque than that of the assist cam 45 is to be applied.

According to the multiple disc clutch apparatus 10 of the embodiment, since the bottom surface of the portion of the recess cam 44 which lies to face the cam (the assist cam 45) which acts when the assist mechanism operates is made deeper than the bottom surface of the portion of the recess cam 44 which lies to face the cam (the back torque reduction cam 46) which acts when the back torque reduction mechanism operates, the degree of close attachment between the primary contact surface 61 of the assist cam 45 and the primary contact surface 51 of the projecting cam 43 can be improved. Since only the bottom surface of the required portion is made deeper, the thickness of the secondary cam member 42 which lies on the side facing the back torque reduction cam 46 does not have to be reduced, thereby making it possible to increase the strength of the back torque reduction cam 46.

According to the multiple disc clutch apparatus 10 of the embodiment, since the judder spring 71 which is fitted around clutch center member 19 and the spring seat 72 which makes up the receiving seat for the judder spring 71 are provided and the spring seat 72 is spline fitted in the engagement grooves 19c formed on the outer circumferential surface of the outer cylindrical portion 19b of the clutch center member 19. Therefore, the radial and circumferential movements of the judder spring 71 can be restricted. By the movements of the judder spring 72 being so restricted, the movement of the judder spring 71 can also be restricted, whereby the wear of the clutch center member 19 by the judder spring 71 can also be suppressed.

DESCRIPTION OF REFERENCE NUMERALS AND SIGNS 10 multiple disc clutch apparatus; 13 main shaft (output shaft); 14 driven gear (input member); 15 clutch outer member; 16 clutch inner member; 17 primary friction disc; 18 secondary friction disc; 19 clutch center member; 19d cylindrical face; 20 pressure plate; 40 cam mechanism; 41 primary cam member; 42 secondary cam member; 43 projecting cam; 44 recess cam; 45 assist cam; 46 back torque reduction cam; 51 primary contact surface; 52 secondary contact surface; 61 primary contact surface; 62 secondary contact surface; 71 judder spring; 72 spring seat.

What is claimed is:

1. A multiple disc clutch apparatus comprising:
   a clutch outer member which is coupled to an input member;
   a clutch inner member which is fixed to an output shaft so as not to rotate with respect to the output shaft;
   a plurality of primary friction discs which are fixed to the clutch outer member so as not to rotate with respect to the clutch outer member;
   a plurality of secondary friction discs which are disposed alternately with the primary friction discs in an axial direction;
   a pressure plate, wherein the primary friction discs and the secondary friction discs are held between the clutch inner member and the pressure plate in the axial direction;
   a clutch center member which is provided between the clutch inner member and the pressure plate in the axial direction, wherein the secondary friction discs are fixed to the clutch center member so as not to rotate with respect to the clutch center member; and
   a cam mechanism adapted to axially move the primary friction discs and the secondary friction discs in a direction in which the primary friction discs and the secondary friction discs are brought into press contact or in a direction in which the primary friction discs and the secondary friction discs move away,
   wherein the cam mechanism comprises a pair of cam members including a projecting cam and a recess cam,
   wherein the pair of cam members are provided between the clutch inner member and the clutch center member,
   wherein contact surfaces of the projecting cam and the recess cam are formed into a curved surface,
   wherein one of the cam members which is disposed on a side of the clutch inner member is formed into an annular shape, and
   wherein said one of the cam members on the side of the clutch inner member extends in a radial direction, and an outer circumferential surface of said one of the cam members is brought into abutment with a cylindrical face on an inner circumferential surface of the clutch center member.

2. The multiple disc clutch apparatus according to claim 1, wherein the cam mechanism includes:
   an assist mechanism adapted to axially move the primary friction discs and the secondary friction discs in the direction in which the primary friction discs and the secondary friction discs are brought into press contact in response to a change in torque of the input member and the output shaft so as to increase an engaging force of the clutch; and
   a back torque reduction mechanism adapted to axially move the primary friction discs and the secondary friction discs in the direction in which the primary friction discs and the secondary friction discs move away so as to reduce the engaging force of the clutch,
   wherein curvatures of contact surfaces of the projecting cam and the recess cam which act when the assist mechanism operates and curvatures of contact surfaces of the projecting cam and the recess cam which act when the back torque reduction mechanism operates are made different, and
   wherein a whole of the outer circumferential surface of said one of the cam members on the side of the clutch inner member is brought into abutment with the cylindrical face of the clutch center member.

3. The multiple disc clutch apparatus according to claim 2, wherein a radial width of a cam of the recess cam which acts when the back torque reduction mechanism operates is made larger than a radial width of a cam of the recess cam which acts when the assist mechanism operates.

4. The multiple disc clutch apparatus according to claim 2, wherein a radial width of the projecting cam is made larger than a radial width of the contact surface of the projecting cam.

5. The multiple disc clutch apparatus according to claim 2, wherein a bottom surface of the recess cam which lies on a side facing the cam which acts when the assist cam mechanism operates is made deeper than a bottom surface of the recess cam which lies on a side facing the cam which acts when the back torque reduction mechanism operates.

6. The multiple disc clutch apparatus according to claim 1, wherein the projecting cam or the recess cam disposed on said one of the cam members on the side of the clutch inner member is provided on a plane which is perpendicular to an axis of the output shaft.

7. The multi disc clutch apparatus according to claim 1, further comprising:
   a judder spring which is fitted around the clutch center member; and
   a spring seat which configures a receiving seat for the judder spring,
   wherein the spring seat is spline fitted on an outer circumferential surface of the clutch center member.

* * * * *

UNITED STATES PATENT AND TRADEMARK OFFICE
CERTIFICATE OF CORRECTION

PATENT NO. : 8,151,964 B2
APPLICATION NO. : 12/640614
DATED : April 10, 2012
INVENTOR(S) : Masayoshi Suzuta et al.

It is certified that error appears in the above-identified patent and that said Letters Patent is hereby corrected as shown below:

ON THE TITLE PAGE:

At item (73), Assignee, change:

"(73) Assignee: Honda Motor Co., Ltd., Tokyo (JP)"

to

--(73) Assignees: Honda Motor Co., Ltd., Tokyo (JP); Kabushiki Kaisha F.C.C., Hamamatsu-shi (JP)--.

Signed and Sealed this
Fourth Day of September, 2012

David J. Kappos
*Director of the United States Patent and Trademark Office*